(No Model.)
T. J. SCOTT.
VEHICLE BRAKE.
No. 308,997. Patented Dec. 9, 1884.
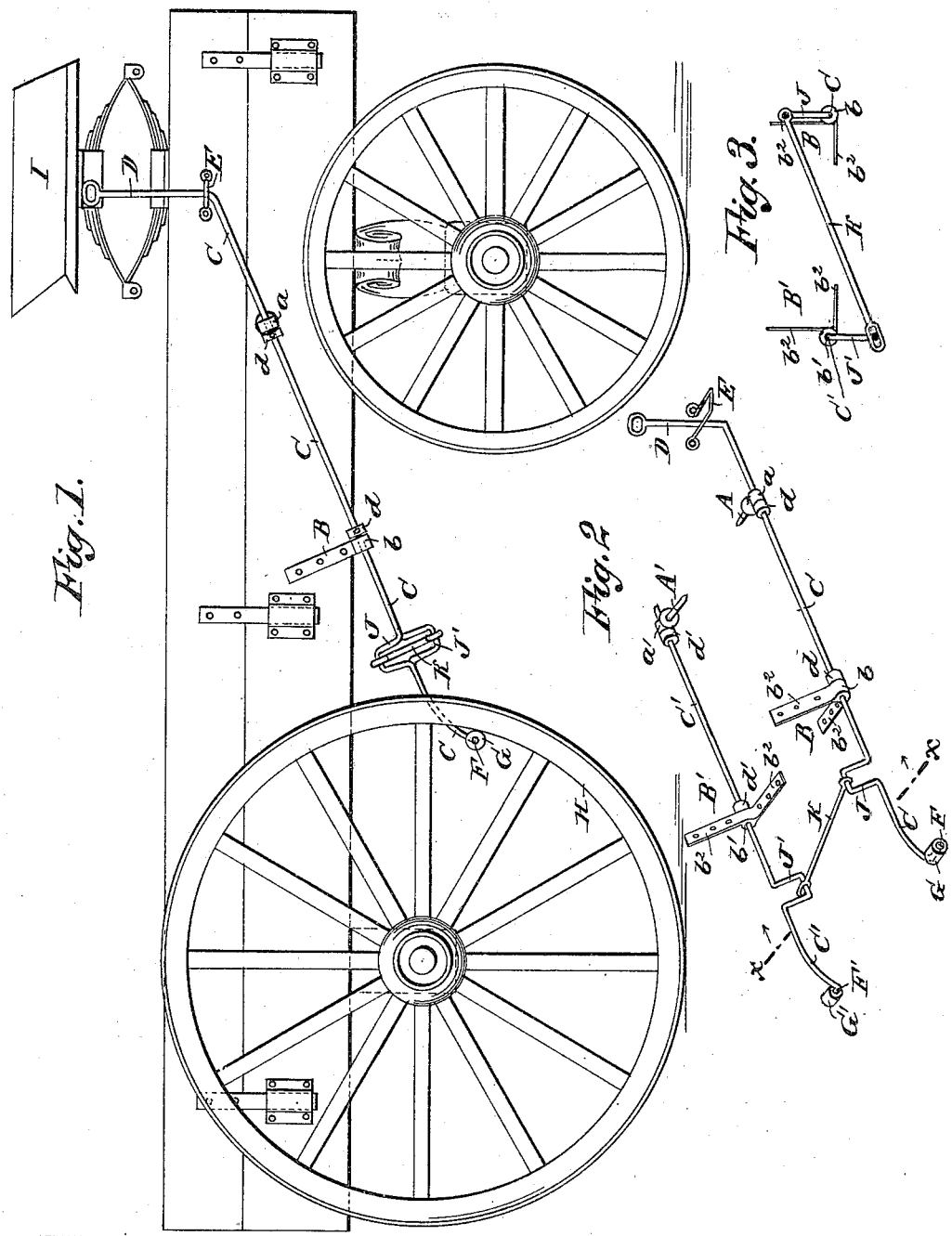
WITNESSES:
Otto W Beyer
C. Sedgwick
INVENTOR:
T. J. Scott
BY Munn & Co.
ATTORNEYS.

UNITED STATES PATENT OFFICE.

THOMAS J. SCOTT, OF ASHLAND, MISSISSIPPI, ASSIGNOR TO HIMSELF AND WILLIAM AUGUSTUS McDONALD, OF SAME PLACE.

VEHICLE-BRAKE.

SPECIFICATION forming part of Letters Patent No. 308,997, dated December 9, 1884.

Application filed August 6, 1884. (No model.)

*To all whom it may concern:*

Be it known that I, THOMAS JEFFERSON SCOTT, of Ashland, in the county of Benton and State of Mississippi, have invented a new and Improved Vehicle-Brake, of which the following is a full, clear, and exact description.

My invention relates to improvements in vehicle-brakes; and it consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a side elevation of an ordinary wagon with my improved brake attached. Fig. 2 shows in perspective view and in smaller scale the improved brake mechanism and attachments as removed from the vehicle; and Fig. 3 is a cross-sectional elevation of the brake, taken on the line $x\,x$, Fig. 2.

I show and will describe my improved vehicle brake or lock as attached to a farm-wagon; but it is applicable as well to buggies and other carriages or wheeled vehicles.

At one side of the vehicle body or box I place and hold in the eye $a$ of a bolt, A, and in the eye $b$ of a strap-iron, B, the brake bar or rod C, the upper end of which is bent to form the handle-bar D, which rises within a keeper, E, made, preferably, in staple form and held by bolts or screws to the body of the vehicle.

On the bar C, next to and inside of the eyes $a\,b$, I fix the collars $d\,d$, which prevent endwise movement or slip of the bar C, which, however, is free to turn axially in the eyes $a\,b$.

At the lower back end of the bar C it curves downward, and then is bent outward to form an arm, F, on which I prefer to place the cushion or buffer G, made, preferably, of rubber, to prevent damage to the spokes as the arm F is swung in between two of them, next to the felly of the wheel H, to lock the wheel when the wagon is on a down grade. The handle D and arm F of the brake-bar C project from the general plane of the bar at right angles to each other, so that when the handle D is pulled inward toward the wagon-body the arm F will be turned outward to enter between the wheel-spokes, and when the handle is let go or pushed outward the arm F will fall clear of the wheel, and the handle will swing outward until it strikes the cross-bar of the keeper E, which serves to prevent the handle falling downward out of reach of the driver sitting on the seat I of the vehicle. I make the strap B with angle-plates $b^2$, which are securely fastened to the side and bottom of the wagon-box, so as the better to resist the strain brought on the brake-bar when the wheel is locked by the arm F.

As thus far described, the brake is complete to lock the wheel at one side of the vehicle, which in some instances is all that will be required; but for some classes of heavy vehicles it may be desirable to have a brake-rod at each side of the vehicle to lock opposite wheels of the vehicle, and the drawings represent such arrangement, a brake-bar, C', being held to the left-hand side of the vehicle-body by an eyebolt, A', and strap B', and having the bent arm F', carrying the buffer or spoke-shield G', substantially as arranged at the right side of the vehicle, and as above described. The brake-bar C' may of course have its own handle, to be operated independently of the other bar, C; but I propose to operate both bars C C', for locking the opposite wheels, by the same handle D at one side of the vehicle, and to accomplish this I make reverse cranks J J' in the bars C C', respectively, and connect the cross bars or heads of the cranks by a tie-rod, K, so that as the handle D is pulled toward the vehicle-body both arms F F' will be turned outward between two spokes of opposite wheels H for locking them both at once, as will readily be understood.

It is evident that my improved brake device is simple, strong, easy to operate, and effective in its action to lock the wheels at the point of junction of a spoke with the felly of the wheel, and the handle D may be made of any suitable length to accommodate the leverage to the strength of the rider or driver and the weight of the vehicle and its load.

Having thus described my invention, what I claim as new, and desire to secure by Letters Patent, is—

1. A brake for vehicles, constructed with two brake-bars, C C', pivoted at opposite sides of the vehicle, and each bar having a wheel-locking arm, and said bars having reverse cranks connected to operate both brake-bars by a handle on one bar to lock opposite wheels of the vehicle at once, substantially as shown and described.

2. In a brake, the combination, with a vehicle-body, of the brake-bars C C', journaled thereto, and provided with the arms F F', the reverse cranks J J', and the connecting-rod K, the bar C being provided with a handle, D, substantially as herein shown and described.

THOMAS J. SCOTT.

Witnesses:
J. H. JORDAN,
WILLIAM HUDSPETH.